(12) United States Patent
Cuthbert (10) Patent No.: US 9,302,776 B2
(45) Date of Patent: Apr. 5, 2016

(54) RAM OUTLET HEADER

(75) Inventor: Jason D. Cuthbert, Adelphi, MD (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 369 days.

(21) Appl. No.: 13/586,210

(22) Filed: Aug. 15, 2012

(65) Prior Publication Data

US 2014/0048229 A1 Feb. 20, 2014

(51) Int. Cl.
*B64D 13/08* (2006.01)
*B64D 13/06* (2006.01)

(52) U.S. Cl.
CPC .............. *B64D 13/08* (2013.01); *B64D 13/06* (2013.01); *B64D 2013/0618* (2013.01); *Y02T 50/56* (2013.01); *Y10T 29/4935* (2015.01)

(58) Field of Classification Search
CPC ........... B64D 13/08; B64D 2013/0618; B64D 13/06; F28F 9/026
See application file for complete search history.

(56) References Cited

U.S. PATENT DOCUMENTS

| | | |
|---|---|---|
| 3,638,719 A | 2/1972 | McGann |
| 4,202,405 A | 5/1980 | Berg |
| 5,414,992 A | 5/1995 | Glickstein |
| 6,526,775 B1 | 3/2003 | Asfia et al. |
| 6,786,275 B2 | 9/2004 | Dey et al. |
| 7,143,824 B2 | 12/2006 | Emrich et al. |
| 7,757,502 B2 | 7/2010 | Merritt et al. |
| 2008/0053101 A1 | 3/2008 | Schwarz |
| 2012/0014784 A1 | 1/2012 | Hipsky et al. |

FOREIGN PATENT DOCUMENTS

| | | |
|---|---|---|
| CN | 102472167 | 5/2012 |
| CN | 102577045 | 7/2012 |
| WO | 2004013555 | 2/2004 |

OTHER PUBLICATIONS

China Patent Application No. 201310321287.3 First Office Action dated Apr. 28, 2015, 6 pages.

*Primary Examiner* — Brian M O'Hara
(74) *Attorney, Agent, or Firm* — Cantor Colburn LLP (57) ABSTRACT

A ram outlet header includes a ram outlet header body. A ram air fan mounting neck and a ram air fan mounting flange are configured to couple the ram outlet header to a ram air fan housing. A heat exchanger mounting flange is configured to couple the ram outlet header to a heat exchanger assembly. A lower face includes a first stiffener. A mid-section includes a second stiffener, a third stiffener, and a fourth stiffener. The ram air fan mounting flange is positioned between the lower face and the mid-section. A ratio of thickness of the second stiffener to the third stiffener is between 1.04 and 1.16, and a ratio of thickness of the fourth stiffener to the third stiffener is between 1.04 and 1.16.

20 Claims, 8 Drawing Sheets

RAM OUTLET HEADER

BACKGROUND OF THE INVENTION

The subject matter disclosed herein relates to an aircraft environmental control system. More specifically, the subject disclosure relates to a ram outlet header for an aircraft environmental control system.

Many types of aircraft use ram air flow for various purposes, such as in cooling systems for an aircraft. For example, ram air flow may be utilized to remove heat from various aircraft lubrication and electrical systems and/or used to condition aircraft cabin air. When the aircraft is in flight, the movement of the aircraft creates a sufficient source of ram air flow which can be used for the purposes described above. When the aircraft is on the ground or is operating at low speeds, a fan is typically utilized to increase air flow to the cooling systems. Cooling flow is drawn at a ram air inlet through a ram inlet header and heat exchangers to a ram outlet header, the fan, and a ram air outlet. The cooling flow can also directly supply cooling air for various components, such as fan and compressor bearings. A wide range of temperature and pressure combinations must be supported by components in a ram air cooling system to account for various loading conditions such as burst conditions, buckling conditions, acceleration, pressure cycling, and the like, while also controlling for weight within an aerospace environment.

BRIEF DESCRIPTION OF THE INVENTION

According to one aspect, a ram outlet header includes a ram outlet header body. A ram air fan mounting neck and a ram air fan mounting flange are configured to couple the ram outlet header to a ram air fan housing. A heat exchanger mounting flange is configured to couple the ram outlet header to a heat exchanger assembly. A lower face includes a first stiffener. A mid-section includes a second stiffener, a third stiffener, and a fourth stiffener. The ram air fan mounting flange is positioned between the lower face and the mid-section. A ratio of thickness of the second stiffener to the third stiffener is between 1.04 and 1.16, and a ratio of thickness of the fourth stiffener to the third stiffener is between 1.04 and 1.16.

According to another aspect, a method of installing a ram outlet header in a ram air cooling system includes coupling a ram air fan housing to a ram air fan mounting neck and a ram air fan mounting flange of a ram outlet header. The ram outlet header further includes a ram outlet header body, a heat exchanger mounting flange, a lower face including a first stiffener, and a mid-section including a second stiffener, a third stiffener, and a fourth stiffener. The ram air fan mounting flange is positioned between the lower face and the mid-section. A ratio of thickness of the second stiffener to the third stiffener is between 1.04 and 1.16, and a ratio of thickness of the fourth stiffener to the third stiffener is between 1.04 and 1.16. The method further includes coupling the heat exchanger mounting flange to a heat exchanger assembly.

The detailed description explains embodiments of the invention, together with advantages and features, by way of example with reference to the drawings.

DETAILED DESCRIPTION OF THE INVENTION

Figure 1:
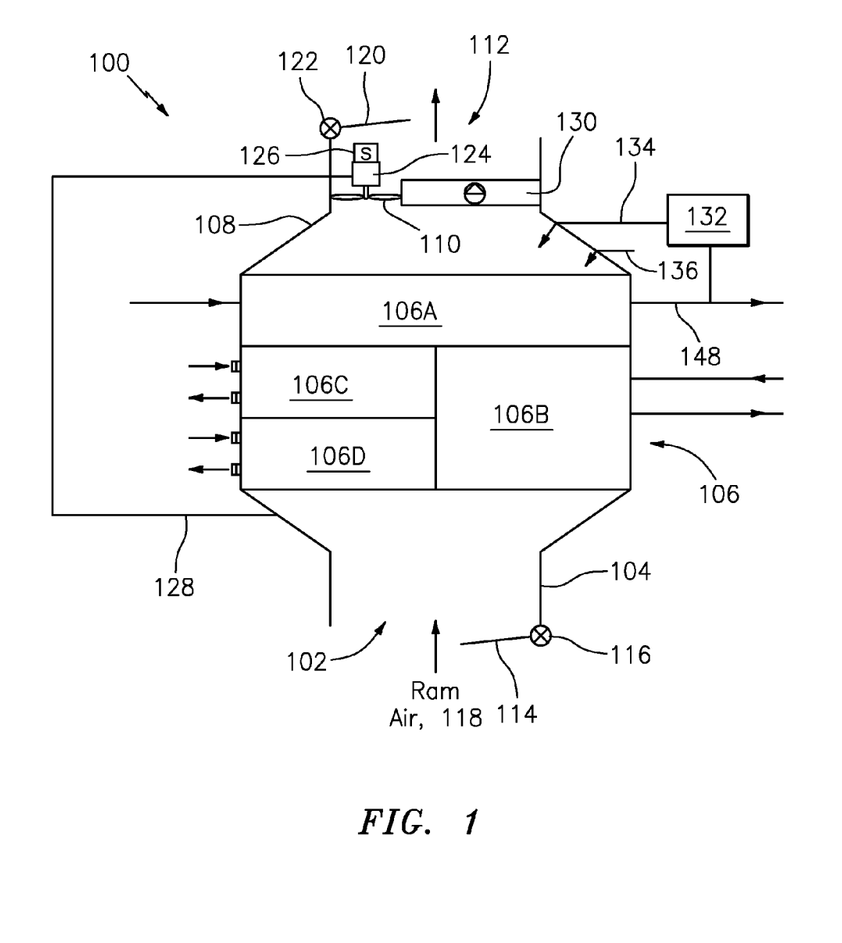
FIG. 1 is a schematic view of an embodiment of a ram air cooling system.
Figure 2:
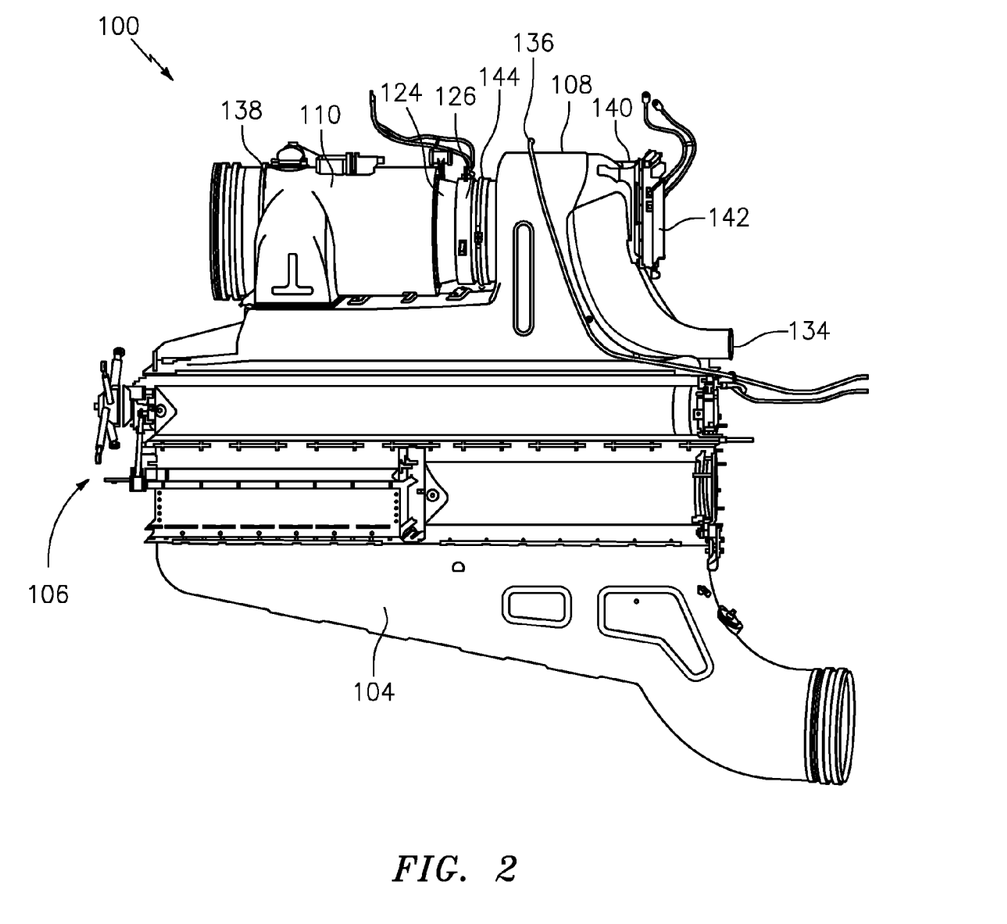
FIG. 2 is a perspective view of an embodiment of the ram air cooling system of FIG. 1.

Shown in FIG. 1 is a schematic view of a ram air cooling system 100 for an aircraft environmental control system (ECS). The ram air cooling system 100 includes a ram air inlet 102, a ram inlet header 104, a heat exchanger assembly 106, a ram outlet header 108, a ram air fan 110, and a ram air outlet 112. When opened, a ram air inlet door 114 controlled by a ram air inlet door actuator 116 allows ram air 118 to enter the ram inlet header 104, pass through the heat exchanger assembly 106 to the ram outlet header 108 and exits through the ram air outlet 112. A ram air outlet door 120 is controlled by a ram air outlet door actuator 122 at the ram air outlet 112. The ram air fan 110 can be used to increase a flow rate of the ram air 118 through the ram air cooling system 100. Alternatively, the ram air 118 may be bypassed around the ram air fan 110 through a ram air fan housing 138 as depicted in FIG. 2. An electric motor 124 drives the ram air fan 110 and may be controlled using a speed sensor 126. The electric motor 124 can receive a ram fan bearing cooling flow 128 drawn from the ram inlet header 104. The ram air cooling system 100 may also include a check valve 130 to control for over-pressure conditions. In an embodiment, the heat exchanger assembly 106 includes a primary heat exchanger 106A, a secondary heat exchanger 106B, a tertiary heat exchanger 106C, and a quaternary heat exchanger 106D. A cooled flow 148 from the primary heat exchanger 106A may be used to cool various heat loads and can be further tapped as a bearing cooling supply for a cabin air compressor (CAC) 132, with a CAC bearing cooling return 134 routed to the ram outlet header 108. A water collector overflow drain 136 is also routed to the ram outlet header 108.

FIG. 2 is a perspective view of an embodiment of the ram air cooling system 100 of FIG. 1. The heat exchanger assembly 106 is coupled to the ram inlet header 104 and the ram outlet header 108. The ram outlet header 108 receives heated ram air that passes through the heat exchanger assembly 106. The ram outlet header 108 also receives a heated bearing cooling supply return from the CAC bearing cooling return 134. The ram outlet header 108 can also receive water at the water collector overflow drain 136. A ram air fan housing 138 is coupled to the ram outlet header 108 via a clamp 144 and can receive a combination of heated ram air, heated bearing cooling supply return air, and water. The ram air fan housing 138 contains the ram air fan 110, electric motor 124, and speed sensor 126 of FIG. 1. The ram outlet header 108 also includes a mounting bracket 140 for a pack control unit 142. The pack control unit 142 may include electronics to control electric components of the ram air cooling system 100, such as the ram air inlet door actuator 116, the ram air outlet door actuator 122, and/or the electric motor 124 of FIG. 1.

Figure 3:
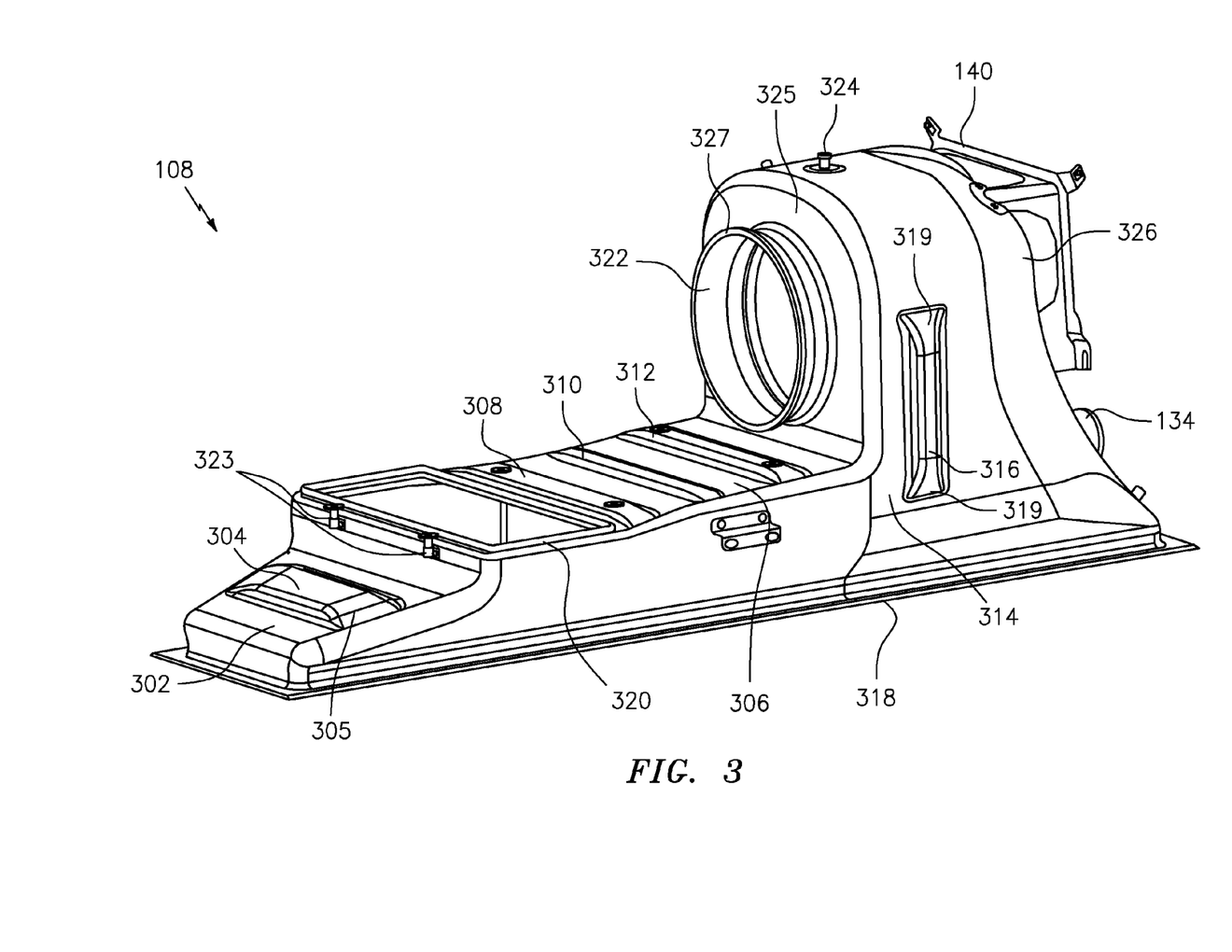
FIG. 3 is a perspective view of a ram outlet header of the ram air cooling system of FIGS. 1 and 2.

FIG. 3 is a perspective view of the ram outlet header 108 of the ram air cooling system 100 of FIGS. 1 and 2. In an embodiment, the ram outlet header 108 is substantially formed of a composite material, such as carbon-bismaleimide. The ram outlet header 108 includes a plurality of stiffeners integrally formed that enhance structural integrity of the ram outlet header 108 and reduce buckling. A lower face 302 of the ram outlet header 108 includes a first stiffener 304. A mid-section 306 of the ram outlet header 108 includes a second stiffener 308, a third stiffener 310, and a fourth stiffener 312. The first through fourth stiffeners 304, 308, 310, 312 each include a pair of taper regions 305 as depicted in FIGS. 3 and 5. A first side face 314 of the ram outlet header 108 includes a fifth stiffener 316, and a second side face 315 positioned on an opposing side of the ram outlet header 108 includes a sixth stiffener 317 as best viewed in respective FIGS. 4B and 4A. The fifth stiffener 316 includes a first pair of taper regions 319 and the sixth stiffener 317 includes a second pair of taper regions 321. The stiffeners 304, 308, 310, 312, 316, and 317 are substantially rectangular in shape. The taper regions 305, 319, and 321 provide substantially smooth transitions for ply layups of composite material.

The ram outlet header 108 also includes a heat exchanger mounting flange 318 to couple the ram outlet header 108 to the heat exchanger assembly 106 of FIGS. 1 and 2. In an embodiment, the fifth and sixth stiffeners 316 and 317 are oriented substantially perpendicular to the heat exchanger mounting flange 318. A ram air fan mounting flange 320 positioned between the lower face 302 and the mid-section 306 of the ram outlet header 108 provides a bypass flow path through the ram air fan housing 138 of FIG. 2. A pair of mounting support regions 323 further support coupling of the ram air fan housing 138 to the ram outlet header 108. A ram air fan mounting neck 322 on a front face 325 of the ram outlet header 108 provides a flow path through the ram air fan 110 of FIG. 1. A mounting collar 327 is affixed to the ram air fan mounting neck 322. A water collector overflow drain boss 324 is joined to a ram outlet header body 326 of the ram outlet header 108 and is configured to receive water from the water collector overflow drain 136 of FIG. 1. The CAC bearing cooling return 134 is joined to the ram outlet header body 326 of the ram outlet header 108.

Figure 4A:
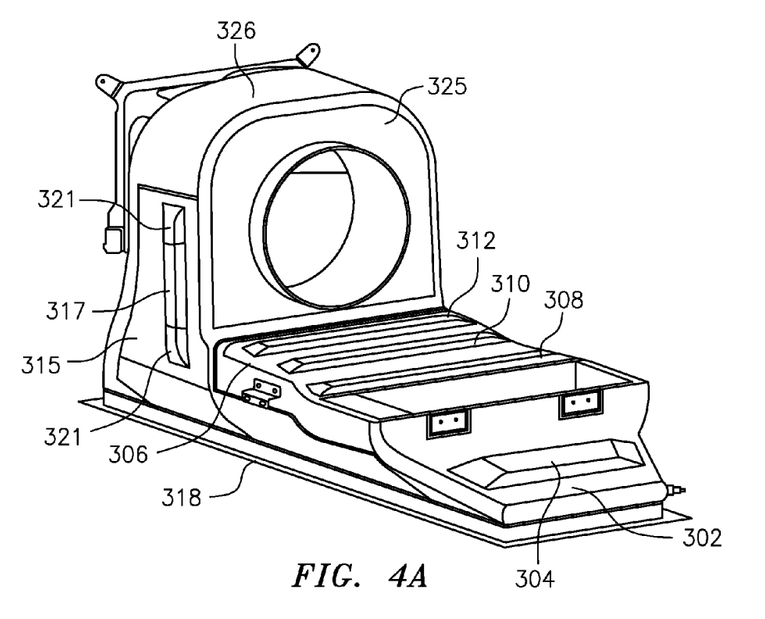
FIGS. 4A and 4B depict various thickness regions of the ram outlet header of FIG. 3.
Figure 4B:
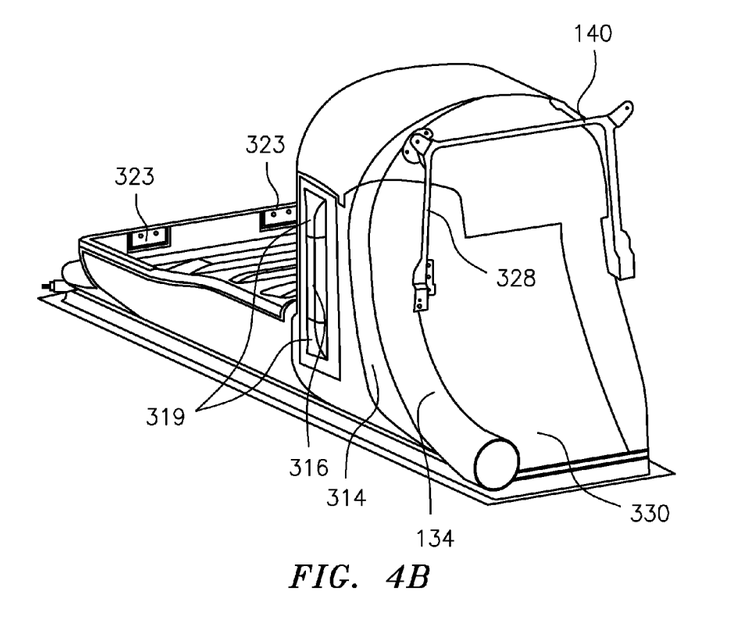
Figure 5:
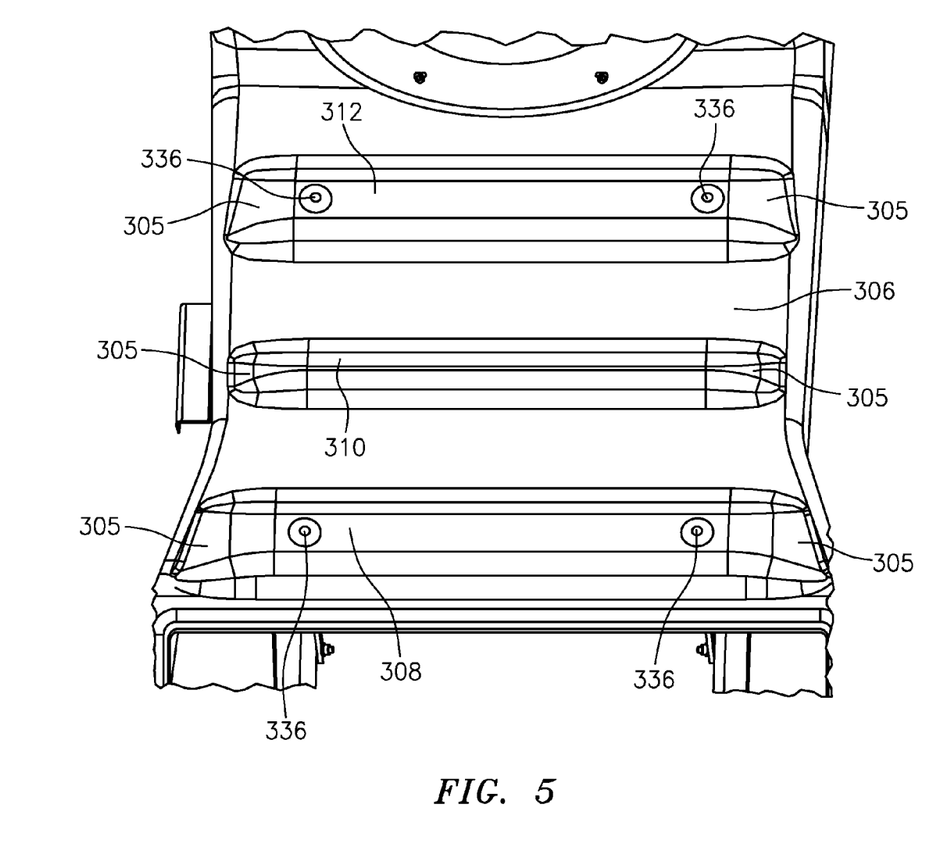
FIG. 5 is a top view of the mid-section of the ram outlet header of FIG. 3.

In an embodiment, the ram outlet header 108 includes a number of varying thickness regions as depicted in FIGS. 4A and 4B. A varying number of plies in different regions of the ram outlet header 108 balance pressure, temperature, flow, weight, environmental, and structural considerations when forming the composite structure of the ram outlet header 108. The lower face 302 and the first stiffener 304 each have a thickness of about 0.1232 inches (0.3193 cm). The mid-section 306, the third stiffener 310, the fifth stiffener 316, and the second pair of taper regions 321 each have a thickness of about 0.154 inches (0.3912 cm). The second stiffener 308, the fourth stiffener 312, and the first pair of taper regions 319 each have a thickness of about 0.1694 inches (0.4303 cm). The first side face 314, the CAC bearing cooling return 134, and the ram outlet header back face 330 each have a thickness of about 0.1078 inches (0.2738 cm). The second side face 315 and the sixth stiffener 317 each have a thickness of about 0.1386 inches (0.3520 cm). The heat exchanger mounting flange 318 and the pair of mounting support regions 323 each have a thickness of about 0.1848 inches (0.4694 cm). The front face 325 and the mounting bracket 140 each have a thickness of about 0.0616 inches (0.1565 cm). The ram outlet header body 326 has a thickness of about 0.0924 inches (0.2347 cm).

In an embodiment, a ratio of thickness of the mid-section 306 to the lower face 302 is between 1.18 and 1.33. A ratio of thickness of the third stiffener 310 to the first stiffener 304 is between 1.18 and 1.33. A ratio of thickness of the mid-section 306 to the front face 325 is between 2.29 and 2.74. A ratio of thickness of the second stiffener 308 to the third stiffener 310 is between 1.04 and 1.16. A ratio of thickness of the fourth stiffener 312 to the third stiffener 310 is between 1.04 and 1.16. A ratio of thickness of the second side face 315 to the first side face 314 is between 1.20 and 1.38. A ratio of thickness of the second side face 315 to the ram outlet header body 326 is between 1.4 and 1.61. A ratio of thickness of the fifth stiffener 316 to the sixth stiffener 317 is between 1.05 and 1.18. A ratio of thickness of the fifth stiffener 316 to the first side face 314 is between 1.34 and 1.52. A ratio of thickness of the second pair of taper regions 321 to the sixth stiffener 317 is between 1.05 and 1.18.

A ratio of thickness of the heat exchanger mounting flange 318 to the ram outlet header body 326 is between 1.88 and 2.14. A ratio of thickness of the first pair of taper regions 319 to the fifth stiffener 316 is between 1.04 and 1.16. A ratio of thickness of the first pair of taper regions 319 to the second pair of taper regions 321 is between 1.04 and 1.16. A ratio of thickness of the pair of mounting support regions 323 to the lower face 302 is between 1.42 and 1.59. A ratio of thickness of the ram outlet header body 326 to the front face 325 is between 1.35 and 1.67. A ratio of thickness of the lower face 302 and the ram outlet header body 326 is between 1.24 and 1.44. A ratio of thickness of the ram outlet header body 326 to the mounting bracket 140 is between 1.35 and 1.67. A ratio of thickness of the CAC bearing cooling return 134 to the ram outlet header body 326 is between 1.08 and 1.27. A ratio of thickness of the ram outlet header back face 330 to the ram outlet header body 326 is between 1.08 and 1.27.

In an embodiment, the ram outlet header 108 includes both primary and secondary retention features at various mounting points. For example, as shown in FIG. 3-4B, the mounting collar 327 is joined to the ram air fan mounting neck 322 using both a primary retention feature, such as an adhesive, and a secondary retention feature, such as rivets or bolts. The CAC bearing cooling return 134 is joined to the ram outlet header body 326 of the ram outlet header 108 using both a primary retention feature, such as an adhesive, and a secondary retention feature, such as rivets or bolts. Similarly, the water collector overflow drain boss 324 is joined to the ram outlet header body 326 of the ram outlet header 108 using both a primary retention feature, such as an adhesive, and a secondary retention feature, such as rivets or bolts. The mounting bracket 140 is also joined to the ram outlet header body 326 of the ram outlet header 108 using both a primary retention feature, such as an adhesive, and a secondary retention feature, such as rivets or bolts. One leg 328 of the mounting bracket 140, as best viewed in FIGS. 4B and 6, may be joined to the CAC bearing cooling return 134 using both a primary retention feature, such as an adhesive, and a secondary retention feature, such as rivets or bolts.

Figure 6:
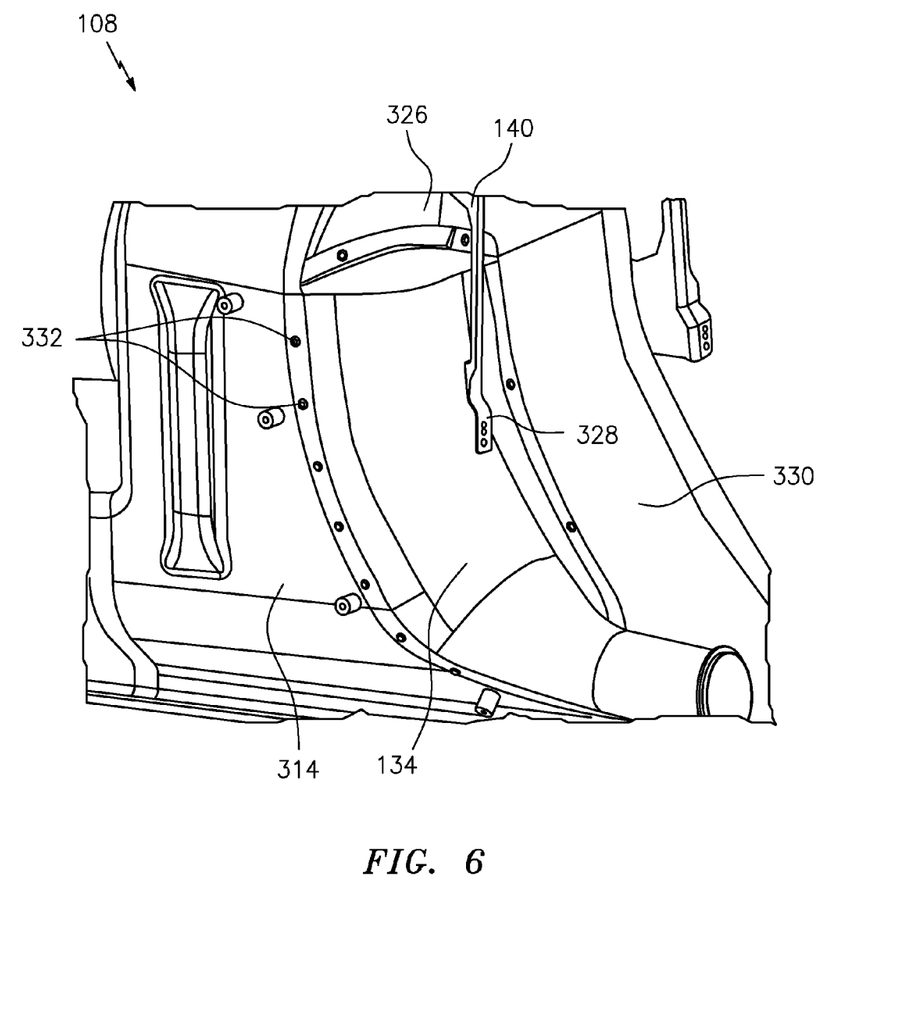
FIG. 6 is a detailed view of secondary retention features joining a cabin air compressor bearing cooling return to a ram outlet header body of the ram outlet header of FIG. 3.
Figure 7:
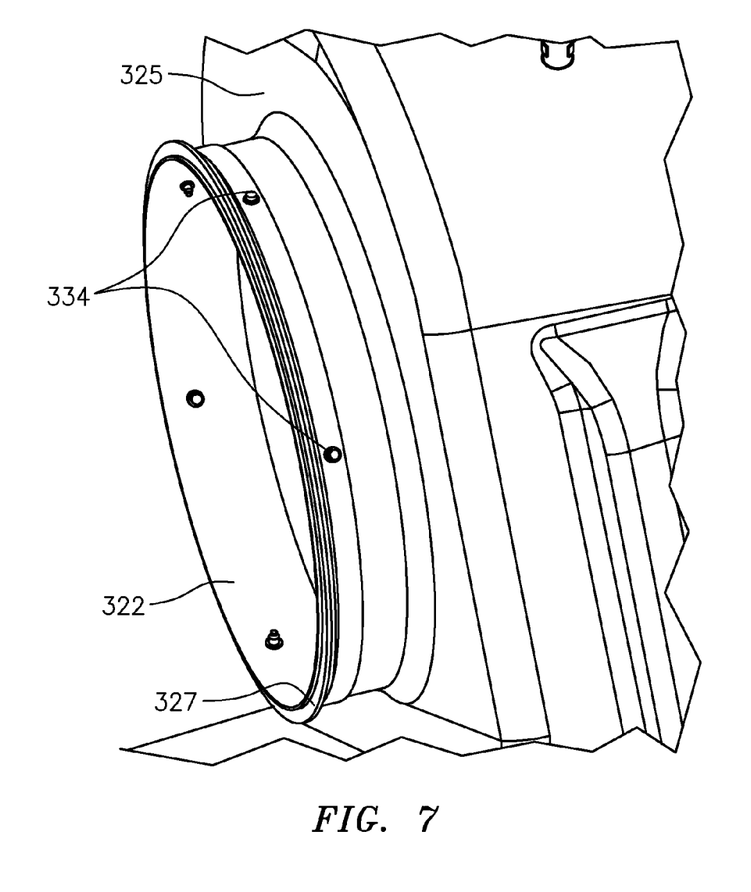
FIG. 7 is a detailed view of secondary retention features joining a mounting collar to a ram air fan mounting neck of the ram outlet header of FIG. 3.

A distribution pattern of secondary retention features may vary between features. For example, secondary retention features 332 are non-uniformly spaced to join the CAC bearing cooling return 134 to the first side face 314, the ram outlet header body 326, and a ram outlet header back face 330 as depicted in FIG. 6. In an embodiment, the secondary retention features 332 are spaced at about 2.8 inches (7.11 cm) apart where the CAC bearing cooling return 134 joins the first side face 314, while the secondary retention features 332 are spaced at about 6.5 inches (16.51 cm) apart where the CAC bearing cooling return 134 joins the ram outlet header body 326 and the ram outlet header back face 330. As depicted in FIG. 7, a distribution pattern of the secondary retention features 334 that join the mounting collar 327 to the ram air fan mounting neck 322 is substantially uniform and includes six secondary retention features 334 spaced about 60 degrees apart around a perimeter of the mounting collar 327.

Figure 8:
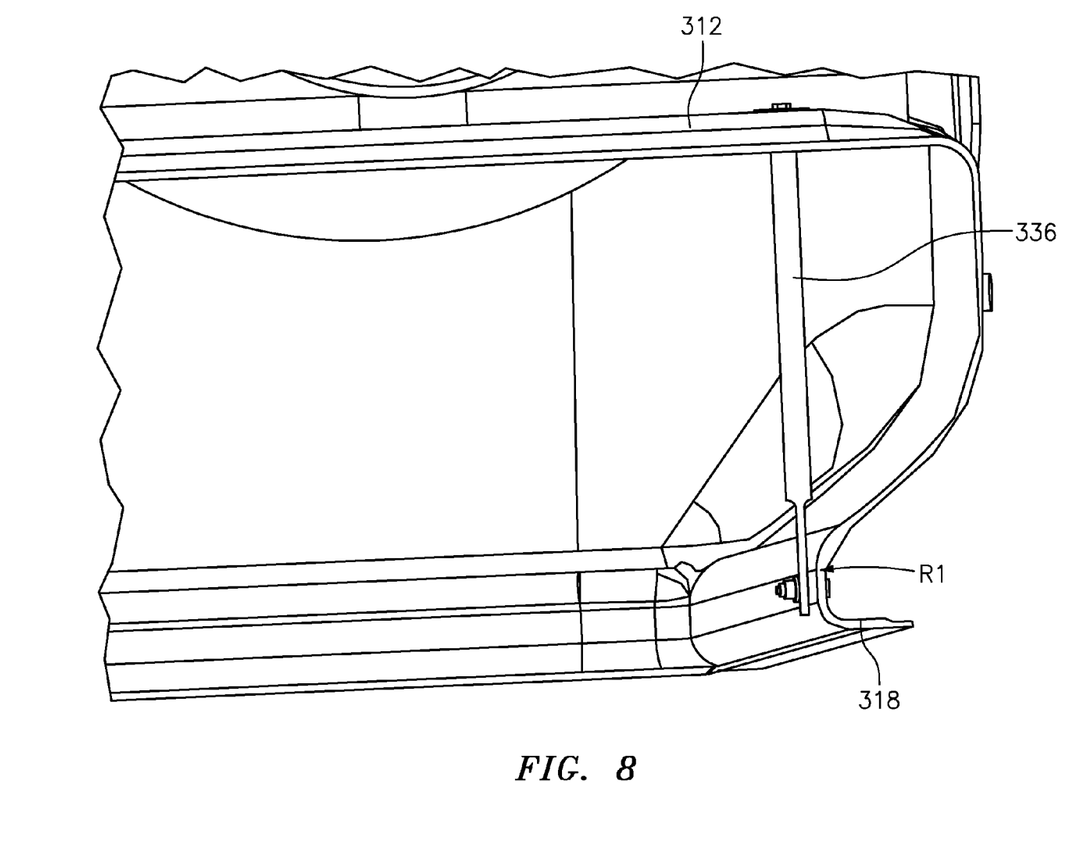
FIG. 8 is a cross-sectional view of a heat exchanger mounting flange of the ram outlet header of FIG. 3.

As depicted in FIG. 8, the heat exchanger mounting flange 318 incorporates a radius R1 of about 0.375 inches (cm). A plurality of support members 336 are coupled between the stiffeners 308, 312 and radius R1 of the heat exchanger mounting flange 318 as depicted in FIGS. 5 and 8. The support members 336 further enhance structural rigidity of the ram outlet header 108.

A process for installing the ram outlet header 108 in the ram air cooling system 100 of FIGS. 1 and 2 includes coupling the ram air fan housing 138 of FIG. 2 to the ram air fan mounting flange 320 and to the ram air fan mounting neck 322 of the ram outlet header 108 of FIG. 3. The clamp 144 may be fitted over the mounting collar 327 to retain the ram air fan housing 138 relative to the ram air fan mounting neck 322. A pack control unit 142 is mounted to the mounting bracket 140 of the ram outlet header 108. The heat exchanger mounting flange 318 of the ram outlet header 108 is coupled to the heat exchanger assembly 106. The CAC bearing cooling return 134 is coupled to the CAC 132. The water collector overflow drain boss 324 is coupled to the water collector overflow drain 136. Additional connections and post installation checks may also be performed.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A ram outlet header comprising:
   a ram outlet header body;
   a ram air fan mounting neck and a ram air fan mounting flange configured to couple the ram outlet header to a ram air fan housing;
   a heat exchanger mounting flange configured to couple the ram outlet header to a heat exchanger assembly;
   a lower face comprising a first stiffener; and
   a mid-section comprising a second stiffener, a third stiffener, and a fourth stiffener, wherein the ram air fan mounting flange is positioned between the lower face and the mid-section, and a ratio of thickness of the second stiffener to the third stiffener is between 1.04 and 1.16, and a ratio of thickness of the fourth stiffener to the third stiffener is between 1.04 and 1.16.

2. The ram outlet header of claim 1, wherein a ratio of thickness of the mid-section to the lower face is between 1.18 and 1.33, and a ratio of thickness of the third stiffener to the first stiffener is between 1.18 and 1.33.

3. The ram outlet header of claim 1, wherein the ram air fan mounting neck is on a front face of the ram outlet header; a ratio of thickness of the mid-section to the front face is between 2.29 and 2.74; and a ratio of thickness of the ram outlet header body to the front face is between 1.35 and 1.67.

4. The ram outlet header of claim 1, further comprising:
   a first side face comprising a fifth stiffener including a first pair of taper regions; and
   a second side face positioned on an opposing side of the ram outlet header relative to the first side face, the second side face comprising a sixth stiffener including a second pair of taper regions, wherein a ratio of thickness of the second side face to the first side face is between 1.20 and 1.38; a ratio of thickness of the second side face to the ram outlet header body is between 1.4 and 1.61; a ratio of thickness of the fifth stiffener to the sixth stiffener is between 1.05 and 1.18; a ratio of thickness of the fifth stiffener to the first side face is between 1.34 and 1.52; and a ratio of thickness of the second pair of taper regions to the sixth stiffener is between 1.05 and 1.18.

5. The ram outlet header of claim 4, wherein a ratio of thickness of the first pair of taper regions to the fifth stiffener is between 1.04 and 1.16, and a ratio of thickness of the first pair of taper regions to the second pair of taper regions is between 1.04 and 1.16.

6. The ram outlet header of claim 4, wherein the first, second, third, and fourth stiffeners each include a pair of taper regions; and the first, second, third, fourth, fifth, and sixth stiffeners are substantially rectangular in shape.

7. The ram outlet header of claim 1, wherein a ratio of thickness of the heat exchanger mounting flange to the ram outlet header body is between 1.88 and 2.14, and a ratio of thickness of the lower face and the ram outlet header body is between 1.24 and 1.44.

8. The ram outlet header of claim 1, further comprising:
   a cooling return joined to the ram outlet header body and a ram outlet header back face by a primary retention feature and a secondary retention feature, wherein a ratio of thickness of the cooling return to the ram outlet header body is between 1.08 and 1.27, and a ratio of thickness of the ram outlet header back face to the ram outlet header body is between 1.08 and 1.27; and
   a mounting bracket comprising a plurality of legs, wherein at least one leg of the mounting bracket is joined to the cooling return, and a ratio of thickness of the ram outlet header body to the mounting bracket is between 1.35 and 1.67.

9. The ram outlet header of claim 8, wherein the ram outlet header is substantially formed of a composite material and further comprising:
   a water collector overflow drain boss joined to the ram outlet header body by the primary retention feature and the secondary retention feature; and
   a mounting collar joined to the ram air fan mounting neck by the primary retention feature and the secondary retention feature, wherein the primary retention feature is an adhesive and the secondary retention feature is one or more of: bolts and rivets.

10. The ram outlet header of claim 1, further comprising a pair of mounting support regions to support coupling of the ram air fan housing to the ram outlet header, wherein a ratio of thickness of the pair of mounting support regions to the lower face is between 1.42 and 1.59.

11. A method of installing a ram outlet header in a ram air cooling system comprising:
   coupling a ram air fan housing to a ram air fan mounting neck and a ram air fan mounting flange of a ram outlet header, the ram outlet header further comprising:
   a ram outlet header body;
   a heat exchanger mounting flange;
   a lower face comprising a first stiffener; and
   a mid-section comprising a second stiffener, a third stiffener, and a fourth stiffener, wherein the ram air fan mounting flange is positioned between the lower face and the mid-section, and a ratio of thickness of the second stiffener to the third stiffener is between 1.04 and 1.16, and a ratio of thickness of the fourth stiffener to the third stiffener is between 1.04 and 1.16; and coupling the heat exchanger mounting flange to a heat exchanger assembly.

12. The method of claim 11, wherein a ratio of thickness of the mid-section to the lower face is between 1.18 and 1.33, and a ratio of thickness of the third stiffener to the first stiffener is between 1.18 and 1.33.

13. The method of claim 11, wherein the ram outlet header further comprises:
   a first side face comprising a fifth stiffener including a first pair of taper regions; and
   a second side face positioned on an opposing side of the ram outlet header relative to the first side face, the second side face comprising a sixth stiffener including a second pair of taper regions, wherein a ratio of thickness of the second side face to the first side face is between 1.20 and 1.38; a ratio of thickness of the second side face to the ram outlet header body is between 1.4 and 1.61; a ratio of thickness of the fifth stiffener to the sixth stiffener is between 1.05 and 1.18; a ratio of thickness of the fifth stiffener to the first side face is between 1.34 and 1.52; and a ratio of thickness of the second pair of taper regions to the sixth stiffener is between 1.05 and 1.18.

14. The method of claim 13, wherein a ratio of thickness of the first pair of taper regions to the fifth stiffener is between 1.04 and 1.16; a ratio of thickness of the first pair of taper regions to the second pair of taper regions is between 1.04 and 1.16; the first, second, third, and fourth stiffeners each include a pair of taper regions; and the first, second, third, fourth, fifth, and sixth stiffeners are substantially rectangular in shape.

15. The method of claim 11, further comprising:
   mounting a pack control unit to a mounting bracket of the ram outlet header, wherein a ratio of thickness of the ram outlet header body to the mounting bracket is between 1.35 and 1.67.

16. The method of claim 15, further comprising:
   coupling a cabin air compressor bearing cooling return of the ram outlet header to a cabin air compressor, wherein the mounting bracket is comprised of a plurality of legs and at least one leg of the mounting bracket is joined to the cabin air compressor bearing cooling return.

17. The method of claim 16, wherein at least one of the legs of the mounting bracket is joined to the ram outlet header body by a primary retention feature and a secondary retention feature, and the cabin air compressor bearing cooling return is joined to the ram outlet header body and a ram outlet header back face by the primary retention feature and the secondary retention feature, wherein the primary retention feature is an adhesive and the secondary retention feature is one or more of: bolts and rivets.

18. The method of claim 17, wherein a ratio of thickness of the cabin air compressor bearing cooling return to the ram outlet header body is between 1.08 and 1.27, and a ratio of thickness of the ram outlet header back face to the ram outlet header body is between 1.08 and 1.27.

19. The method of claim 11, further comprising:
   coupling a water collector overflow drain to a water collector overflow drain boss of the ram outlet header, wherein the water collector overflow drain boss is joined to the ram outlet header body of the ram outlet header by a primary retention feature and a secondary retention feature; and
   fitting a clamp over a mounting collar to retain the ram air fan housing relative to the ram air fan mounting neck, wherein the mounting collar is joined to the ram air fan mounting neck by the primary retention feature and the secondary retention feature.

20. The method of claim 11, wherein the ram outlet header is substantially formed of a composite material, and the ram outlet header further comprises a pair of mounting support regions to support coupling of the ram air fan housing to the ram outlet header, wherein a ratio of thickness of the pair of mounting support regions to the lower face is between 1.42 and 1.59; a ratio of thickness of the heat exchanger mounting flange to the ram outlet header body is between 1.88 and 2.14; and a ratio of thickness of the lower face and the ram outlet header body is between 1.24 and 1.44; and further wherein the ram air fan mounting neck is on a front face of the ram outlet header; a ratio of thickness of the mid-section to the front face is between 2.29 and 2.74; and a ratio of thickness of the ram outlet header body to the front face is between 1.35 and 1.67.

* * * * *